United States Patent [19]

Tripp, Jr.

[11] 4,071,974
[45] Feb. 7, 1978

[54] THERMAL RETAINING GARDEN WATER BLANKET

[76] Inventor: Ralph N. Tripp, Jr., 775 Fairacres Ave., Westfield, N.J. 07090

[21] Appl. No.: 710,560

[22] Filed: Aug. 2, 1976

[51] Int. Cl.² .............................................. A01G 13/00
[52] U.S. Cl. ....................................... 47/2; 24/263 R; 47/9; 47/32; 150/3
[58] Field of Search ................. 47/2, 29, 9, 32; 150/5, 150/3; 61/36 R, 36 A; 5/344, 370; 24/263 FC; 248/101

[56] References Cited

U.S. PATENT DOCUMENTS

| 2,109,881 | 3/1938 | Goldberg | 5/344 |
|---|---|---|---|
| 2,241,029 | 5/1941 | Harrison | 24/263 FC |
| 3,206,892 | 9/1965 | Telkes et al. | 47/29 |
| 3,860,172 | 1/1975 | Platt | 47/9 X |

FOREIGN PATENT DOCUMENTS

| 290,648 | 6/1965 | Netherlands | 47/32 |
|---|---|---|---|
| 567,561 | 2/1945 | United Kingdom | 150/5 |
| 1,144,366 | 3/1969 | United Kingdom | 47/2 |

*Primary Examiner*—Edgar S. Burr
*Assistant Examiner*—Steven A. Bratlie
*Attorney, Agent, or Firm*—Orrin M. Haugen

[57] ABSTRACT

Thermal energy retaining means for use in covering soil adjacent growing plants and including a water tight elongated tubular sleeve enclosure having support means at opposed ends thereof. The support means consist of planar means or generally inverted "U" shaped configuration, and each comprising a pair of generally parallelly disposed legs spaced apart by an upper fixed cross-member. A second cross-member, slidably coupled to the legs of the inverted "U" shaped bracket is provided which extends generally parallel to the upper cross-member to form a jaw to receive the tubular sleeve material therebetween. After filling with water, the width of the tubular sleeve material is placed within the jaw of the hanger means, the hanger means then being rotated about the sleeve so as to seal the ends of the sleeve and adjust the axial length thereof.

4 Claims, 4 Drawing Figures

U.S. Patent  Feb. 7, 1978  4,071,974 ial plot. The system is particularly adapted to be placed in a garden site adjacent growing plants, with the arrangement being adapted to become warmed during the day as a result of exposure to solar radiation, with the heat capacity of the structure being sufficient to retain and dissipate thermal energy during the nighttime hours to reduce the danger of exposure to frost, particularly during the early portion of the growing season.

THERMAL RETAINING GARDEN WATER BLANKET

BACKGROUND OF THE INVENTION

The present invention relates generally to an improved thermal energy retaining means, and more specifically to an improved thermal energy retaining means adapted for use in garden plots. The system is particularly adapted to be placed in a garden site adjacent growing plants, with the arrangement being adapted to become warmed during the day as a result of exposure to solar radiation, with the heat capacity of the structure being sufficient to retain and dissipate thermal energy during the nighttime hours to reduce the danger of exposure to frost, particularly during the early portion of the growing season.

In those certain latitudes where frost may be expected to last into the early portion of the growing season, measures must be taken to protect young plants from exposure to frost conditions. Frequently, gardeners may cover an entire garden plot with plastic film or the like when frost is predicted, with such a covering operation being cumbersome, burdensome, and expensive. Frequently, if winds arise before the plastic film or other covering may be removed, the film or other covering may become broken or dislodged, and may damage young plants if the material were to fall to the ground. The aspects of the present invention make it possible to place water filled tubular sleeve members adjacent growing plants, with the water filled members being firmly retained in place and sealed against leakage. The water retaining members are easily assembled and filled, and expeditiously placed in operation.

Specifically, an elongated sleeve of flat tubular form is provided, and is arranged to be filled with water and placed in the area adjacent growing plants. The heat capacity of the filled members protects the adjacent plants from exposure to light frost, particularly during the nighttime hours.

In the past, it has been suggested that water-filled plastic tubes be provided for placement adjacent rows of growing plants. In this connection, it has been suggested that a filling valve be installed in the tubing to permit in-place filling. These plastic tubes have been fabricated of fixed length, and thus making it difficult to properly match the length of the tubular plastic materials to the requirements of the garden plot. Since it is impractical to provide large numbers of these containers, it has been found more desirable to utilize elongated tubing which requires a minimum of filling operations.

SUMMARY OF THE INVENTION

In accordance with the present invention, flat plastic tubing may be cut to any desired length, placed into position, and filled with water while in position. The ends of the tube are closed and held in position with the ends elevated to prevent escape of water. Furthermore, the hanger means is designed so as to permit the film to be wrapped about the hanger, with the cross-members of the hanger operating or functioning substantially as a winding core. This permits field installation with a minimum of advance cutting or fitting being required.

The hanger means for use in connection with the plastic tubing is fabricated from a generally inverted "U" shaped bracket having a pair of elongated parallelly disposed legs with an upper cross-member secured to the legs. A second cross-member is provided which has a loop or eye at each end thereof so as to permit the second cross-member to slide along the legs of the "U" shaped member. The length of the second cross-member is slightly less than the parallel distance between the legs so as to provide ease of assembly.

The structure of the hangers is such that they are easily utilized, and provide a durable arrangement for the system.

Use of the water filled containers has been found to increase the useful growing season in any given installation inasmuch as risk of damage from frost is reduced, particularly during those periods of the early portion of the growing season when frost may occur, particularly light frost.

Therefore, it is a primary object of the present invention to provide an improved means for retaining water tight elongated tubular sleeve enclosures in place adjacent rows of growing plants, with a hanger means providing for sealing the ends of the tubular sleeve and adjusting the axial length thereof.

It is yet a further object of the present invention to provide an improved hanger means for water tight elongated tubular sleeve enclosures arranged for placement adjacent growing plants, with the hanger means providing for both sealing and length adjustment of the tubular sleeves.

Other and further objects of the present invention will become apparent to those skilled in the art upon a study of the following specification, appended claims, and accompanying drawing.

DESCRIPTION OF THE PREFERRED EMBODIMENT

Figure 1:
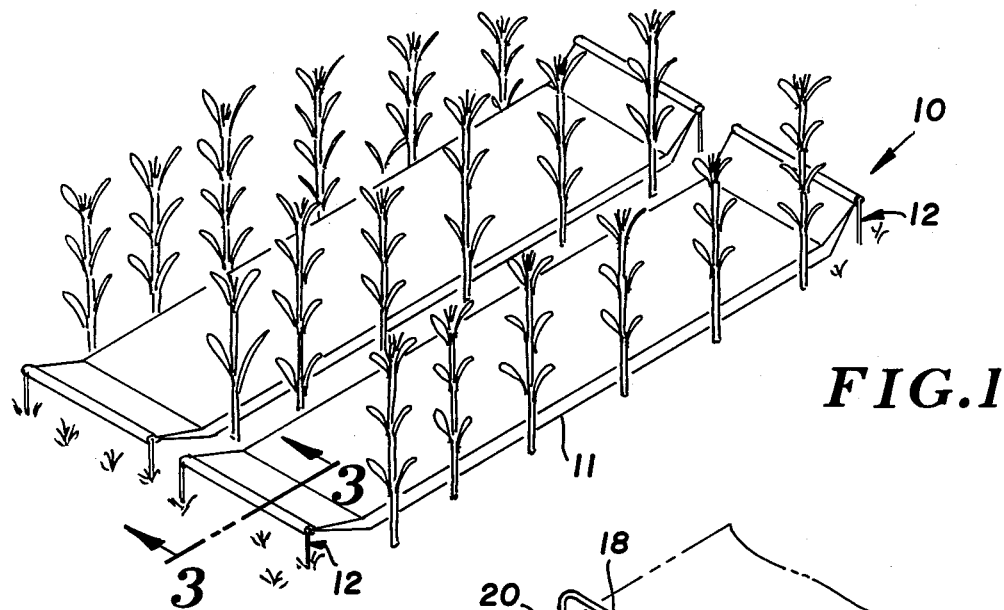
FIG. 1 is a top perspective view of a pair of thermal energy retaining tubular sleeve elements situated adjacent and between rows of growing plants.
Figure 4:
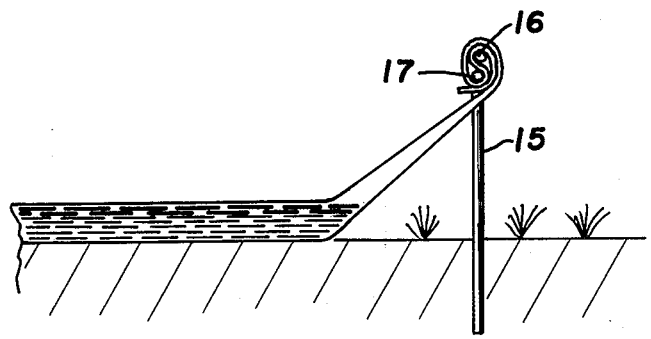
FIG. 4 is a side elevational view of the water retaining sleeve members as illustrated in FIG. 1, with FIG. 4 illustrating the details of the wrapped and sealed sleeve ends.

The thermal energy retaining means generally designated 10 includes a water tight elongated tubular sleeve of plastic film 11 retained between hanger brackets 12—12 disposed at opposed ends thereof. The interior of the sleeve 11 provides an enclosure for retaining a quantity of water therewithin. FIGS. 1 and 4 illustrate the device in an actual garden plot, and further illustrate the relative disposition of the device relative to the growing plants. As has been indicated, hanger means are provided at the opposed ends of tubular sleeve 11, such as at 12—12. Each of the hangers comprises a generally inverted "U" shaped bracket with a pair of parallelly disposed legs 15—15 spaced apart with a first cross-member 16 at the top thereof. A second cross-member 17 is slidably coupled to the legs of the "U" shaped bracket 12, with the second cross-member 17 extending generally parallel to the first cross-member 16. A jaw zone is provided as at 18 for receiving the tubular sleeve between cross-members 16 and 17. Cross-member 17 is provided with eyes at the opposed ends thereof, such as is illustrated at 20.

Preferably, in an actual installation, cross-member 17 will be slightly shorter than cross-member 16 so as to cause the legs 15—15 to bend or flex inwardly. Friction will develop between the eye 20 and the shaft of legs 15—15, and thereby assist in retaining cross-member 17 in place on the "U" shaped bracket when actually in place, and prevent member 17 from falling downwardly on the legs. The round bend will also be of assistance in this regard.

Figure 2:
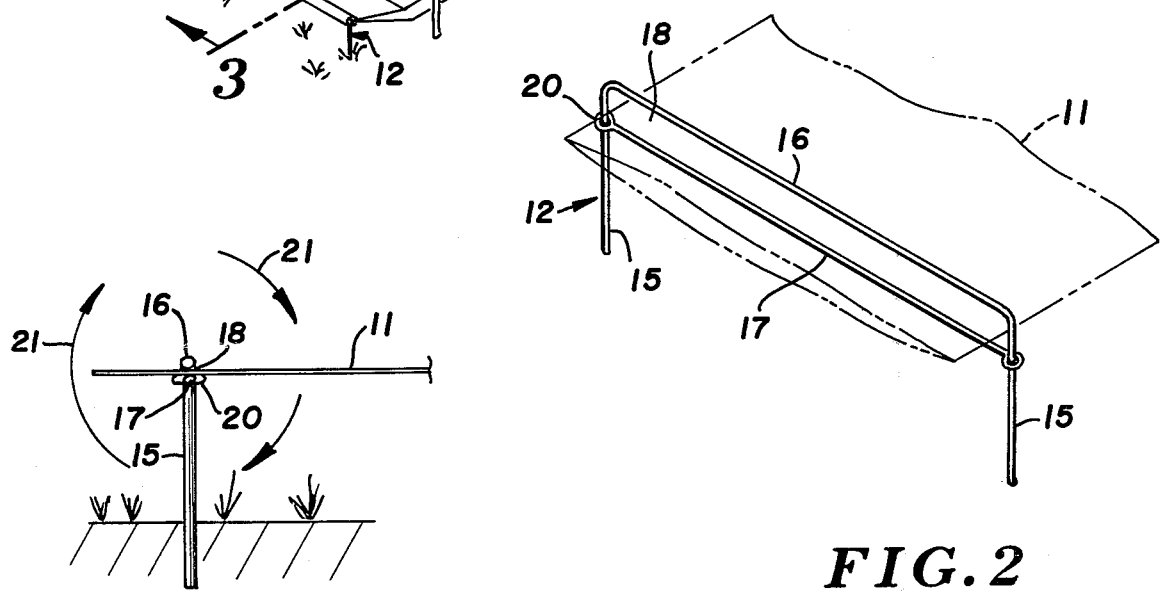
FIG. 2 is a fragmentary perspective view on a slightly enlarged scale and illustrating the manner in which the end of the tubular sleeve is inserted into the hanger means, with the tubular sleeve member being illustrated in phantom.

The length of the cross-members 16 and 17 is at least equal to the width of the tubular sleeve, in order to permit the sleeve to be received within the jaw zone 18. This relative relationship is illustrated in detail in FIGS. 1 and 2.

Figure 3:
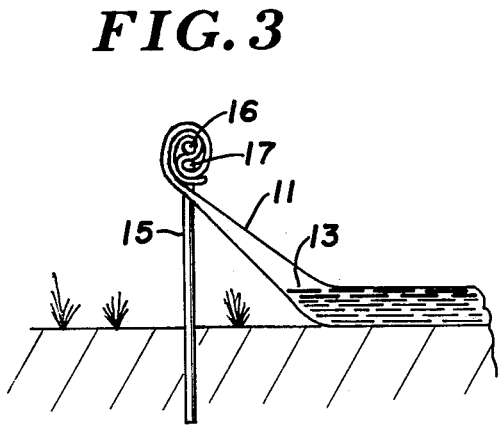
FIG. 3 is a vertical sectional view taken along the line and in the direction of the arrows 3—3 of FIG. 1, and illustrating the tubular sleeve member being retained in the hanger means, and further illustrating schematically the manner in which the hanger means is rotated relative to the tubular sleeve means to seal the ends of the sleeve and adjust the axial length thereof.

As is indicated in FIG. 3, sleeve 11 is received across its width in the jaw 18, and arrows 21—21 indicate the rotation of hanger means 12 about an axis defined by cross-members 16 and 17. Winding of the hanger means about the tubular sleeve 11 provides sealing of the ends of the tubular sleeve, as well as adjustment of the axial length. Following the winding operation, the free ends of the legs 15—15 are inserted into the ground, as indicated in FIG. 4, and the filled sleeve member is then secured in place.

In an actual installation operation, the tubular sleeve member is cut to the desired length and placed in position. One hanger is opened and the open end of the tubing is inserted through the opening, with the jaw 18 of the hanger then being closed onto the surface of the tubing, and thereafter the hanger is rotated as indicated in FIG. 3 for two or three revolutions. The legs of the hanger member are then inserted into the ground, the distance of insertion being such that the closure made at the end of the tube will be above the water level in the tube following filling. With the free end of the tubular sleeve then being held open, water is introduced into the sleeve member so as to provide a reasonable fill of, for example, two inches of water in a flat tubular sleeve of 12 inch width. Following filling, and with the free end held above the water level, the free end of the tube is placed within the jaw of the hanger, the hanger then rotated about the sleeve as indicated in FIG. 3, and following a wrap of two or three revolutions, the free ends 15—15 of the member are inserted into the ground.

In addition for an application for growing plants, the filled plastic tubes may be useful in anchoring down items which could be moved or damaged by wind, such as swimming pool covers or the like.

In actual use, the plastic film is preferably polyethylene tubing containing a black pigment. Solar energy provides a means for heating the water during the daylight hours, with this heat then being stored and given off slowly in the nighttime hours. Protection is then obtained from light frost conditions, particularly in the early portion of the growing season.

In addition to protection from frost, the utilization of these thermal energy retaining means has been found to eccelerate early Spring plant growth. Tomato plants which are provided with the apparatus of the present invention show an eccelerated Spring growth, and higher fruit yields and greater root structure were found to result. Similarly, certain varieties of fruit and vegetables may be grown in areas where such growth was not heretofore possible, particularly when the effective growing season may be extended through the use of these thermal energy retaining means.

In addition to protection in the early days of the growing season, these devices provide for protection at the end of the growing season when the fruit is ripening. Ground temperatures are found to be somewhat higher, such as approximately 5° higher than comparable fields without this protection. In addition, air temperatures particularly near the surface have been found to be from 3° to 4° higher.

It will be appreciated that various modifications of the arrangement may be made to accommodate various situations. For example, black polyethylene tubing of 2-4 mil thickness may be utilized in widths up to 12 inches, with this arrangement providing structural durability for the intended purpose. The hanger means is provided so as to avoid puncturing the film, thereby preserving the integrity of the overall structure.

I claim:

1. In a thermal energy retaining means for use in covering soil adjacent growing plants and having a water tight elongated tubular sleeve enclosure of plastic film with open ends and with support means at opposed ends thereof and being further characterized in that:
   a. said support means comprising hanger means at opposed ends of said elongated tubular sleeve and comprising a generally inverted "U" shaped bracket with a pair of generally parallelly disposed spaced apart legs with a first cross-member extending between said legs at the top thereof;
   b. a second cross-member slidably coupled to the spaced apart legs of said "U" shaped bracket and extending generally parallel to said first cross-member to form a jaw with said first member when adjacent thereto to receive said elongated tubular sleeve therebetween; and
   c. the length of said cross-members being at least equal to the width of said elongated tubular sleeve and being arranged to form a winding core for the opposed open ends of said tubular sleeve for sealing the ends and adjusting the axial length thereof.

2. The thermal energy retaining means as defined in claim 1 being particularly characterized in that said elongated tubular sleeve is fabricated from blackened polyethylene film.

3. The thermal energy retaining means as defined in claim 1 being particularly characterized in that said second cross-member is provided with leg encircling eyes at the opposed ends thereof, the inner diameter of said eyes being greater than the outer diameter of said parallelly disposed spaced apart bracket legs with said second cross-member being slidable on said spaced apart bracket legs.

4. The thermal energy retaining means as defined in claim 3 being particularly characterized in that said parallelly disposed spaced apart bracket legs are elongated so as to provide soil penetration.

* * * * *